United States Patent [19]

Tweedle

[11] Patent Number: 4,860,362

[45] Date of Patent: Aug. 22, 1989

[54] HEARING AID AND METHOD FOR MAKING IT

[75] Inventor: Allan F. Tweedle, Linden, N.J.

[73] Assignee: Siemens Hearing Instruments, Inc., Piscataway, N.J.

[21] Appl. No.: 94,235

[22] Filed: Sep. 8, 1987

[51] Int. Cl.[4] .......................... H04R 25/02; B29C 65/00; B32B 31/18

[52] U.S. Cl. .......................... 381/69; 156/258; 156/304.2; 156/304.5; 181/130; 381/68.6

[58] Field of Search .......................... 381/69, 69.2, 68.6; 181/130, 135, 132; 29/594; 403/375; 156/258, 304.5, 304.1, 304.2

[56] References Cited

U.S. PATENT DOCUMENTS

| | | | |
|---|---|---|---|
| 1,908,850 | 5/1933 | Kinsley et al. | 181/132 |
| 3,110,356 | 11/1963 | Mendelson | 181/130 |
| 3,496,306 | 2/1970 | Pollak | 381/68.6 |
| 4,550,227 | 10/1985 | Topholm | 381/69 |
| 4,672,672 | 6/1987 | Eggert et al. | 381/69 |
| 4,716,985 | 1/1988 | Haertl | 381/68.6 |

FOREIGN PATENT DOCUMENTS

| | | |
|---|---|---|
| 188661 | 7/1986 | European Pat. Off. . |
| 186748 | 9/1986 | European Pat. Off. . |
| 3406971 | 8/1985 | Fed. Rep. of Germany . |

*Primary Examiner*—Jin F. Ng
*Assistant Examiner*—Danita R. Byrd
*Attorney, Agent, or Firm*—Mark H. Jay

[57] ABSTRACT

The shell of a hearing aid has an open end with a mating surface. The mating surface mates with a non-planar faceplate. Advantageously, the faceplate is shaped as a part of a sphere. Further advantageously, the surface is shaped by grinding.

5 Claims, 3 Drawing Sheets

HEARING AID AND METHOD FOR MAKING IT

BACKGROUND OF THE INVENTION

The invention relates to hearing aids, and more particularly relates to hearing aids of the in-the-ear ("ITE") type.

A conventional ITE hearing aid has a custom-molded open-ended shell and a flat faceplate. The shell is molded to fit the user's ear and the faceplate is secured to the open end of the shell (as by gluing). The faceplate (which initially is substantially larger than the shell) is then cut down (as by grinding) to conform to the periphery of the shell and thereby produce a finished hearing aid.

This has certain disadvantages. One such disadvantage is that the unit has a comparatively large appearance. Another disadvantage is that the use of a flat faceplate diminishes the volume inside the hearing aid.

SUMMARY OF THE INVENTION

One object of the invention is to provide a hearing aid, particularly an ITE hearing aid, which appears smaller than conventional ITE hearing aids.

Another object is to provide an ITE hearing aid with a larger interior volume.

Still another object is, in general, to improve on known ITE hearing aids.

In accordance with the invention, the open end of the shell of the hearing aid has a mating surface which is shaped to mate with a non-planar faceplate. Advantageously, the faceplate is shaped to form a section of a sphere, and the shaping of the shell is advantageously carried out by grinding.

By using a non-planar faceplate, and particularly by using a faceplate which is shaped as a section of a sphere, it is easy to mount the faceplate to the open end of the shell. It has been found that a convex faceplate, especially a faceplate which is shaped as a part of a sphere, appears smaller than a flat faceplate of equal peripheral dimensions. Additionally, the additional room underneath the faceplate makes it easier to fit more electrical circuitry into the hearing aid.

BRIEF DESCRIPTION OF THE DRAWINGS

Exemplary and non-limiting preferred embodiments of the invention are shown in the drawings, in which.

DETAILED DESCRIPTION OF PREFERRED EMBODIMENTS

In the following description, reference is made to a shell and to a faceplate. The shells and faceplate illustrated herein are illustrative only, and are not to scale and may not accurately represent the appearance of any particular hearing aid. This is because ITE hearing aids are custom made for the user and each shell is manufactured to fit the user's ear. Thus, the outer shape of a shell may not and indeed probably will not have the same appearance as the shell illustrated herein.

Furthermore, the faceplates illustrated herein are likewise not necessarily representative of the faceplate of any particular hearing aid. Different faceplates have different doors for receiving batteries, and likewise have different numbers and arrangements of switches, volume controls, etc., depending upon the application. The presence or absence of battery covers, controls, etc. is not part of this invention.

Figure 1:
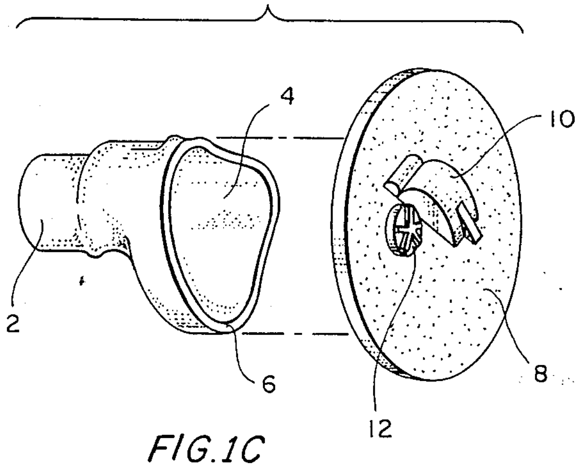
FIG. 1 (PRIOR ART)
FIGS. 1A–1E illustrate assembly of a conventional ITE hearing aid.
Figure 1B:
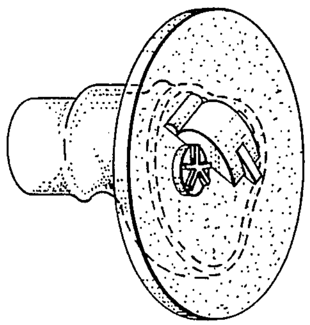
FIG. 1B (PRIOR ART)
Figure 1C:
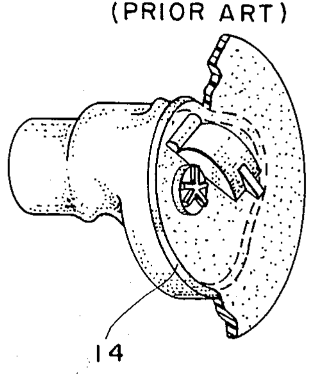
FIG. 1C (PRIOR ART)
Figure 1D:
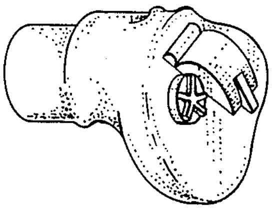
FIG. 1D (PRIOR ART)
Figure 1E:
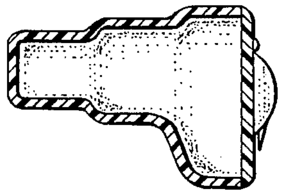
FIG. 1E (PRIOR ART)
Figure 2A:
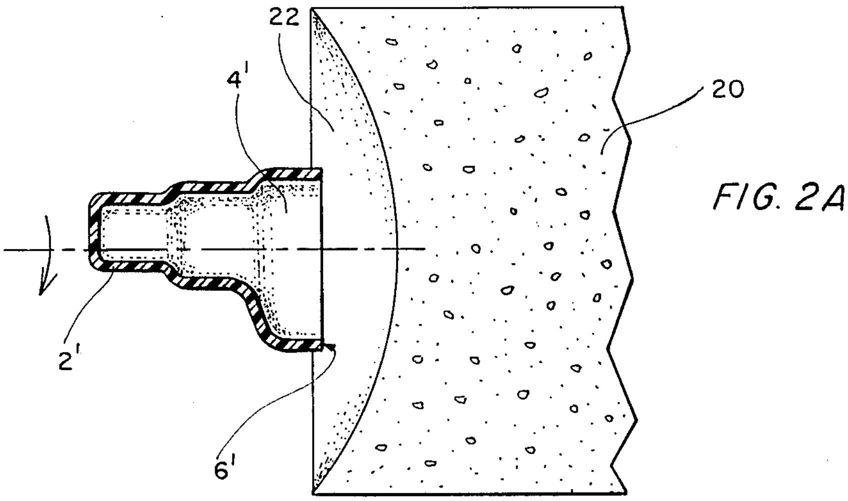
FIGS. 2A–2C illustrate manufacture of a shell in accordance with the invention.
Figure 2B:
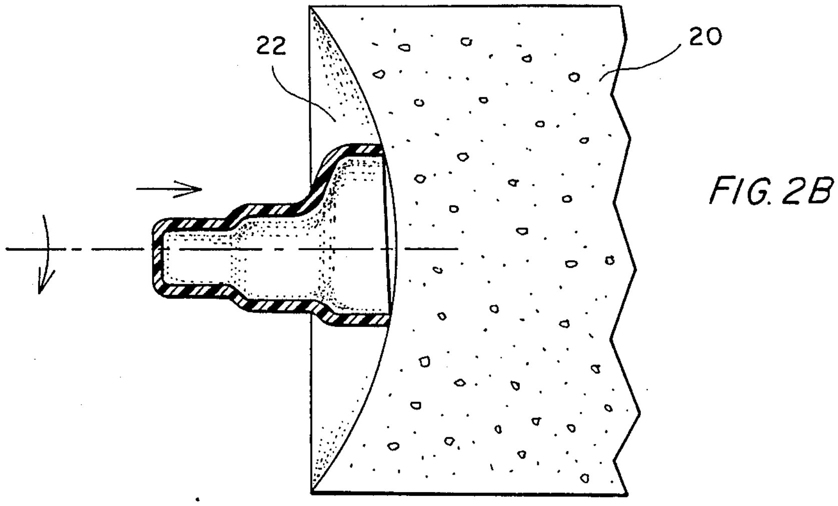
Figure 2C:
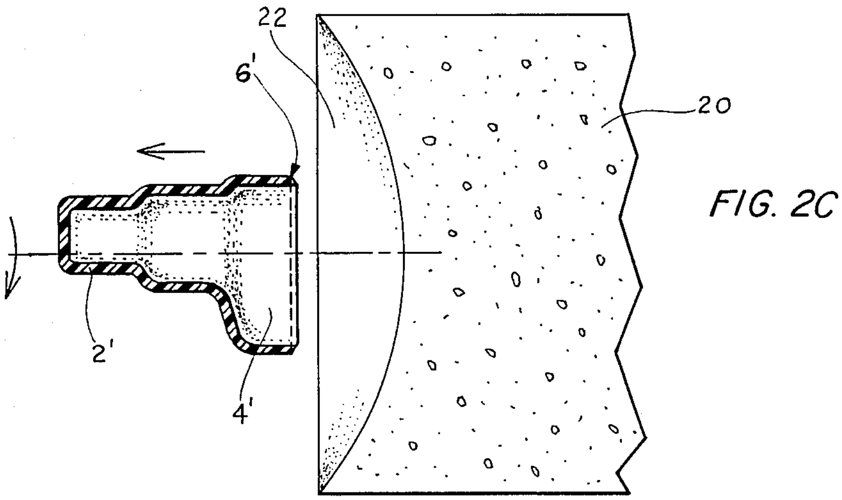

In the conventional hearing aid illustrated in FIG. 1, a shell 2 is custom molded to fit the inside of a user's ear (not shown). The shell 2 has an open end 4 which is delimited by a flat mating surface 6. A flat disk-shaped faceplate 8 (which in this illustration has a battery door 10 and a volume control 12) is conventionally attached (as by glue) to the shell 2 at the mating surface 6. As shown in FIG. 1B, the faceplate 8 is initially oversize relative to the exterior periphery of the shell 2 adjacent its mating surface 6.

In accordance with conventional manufacturing practices, the faceplate 8 is then cut down as by hand grinding to conform to the exterior periphery of the shell 2. The circumferential edge 12 of the faceplate 8 is then rounded off.

In accordance with the invention, the mating surface 6' of the open end 4' of the shell 2' is shaped so as to mate with a non-planar faceplate. Advantageously, the mating surface 6' is ground down by a specially shaped rotating stone 20 which has a concave grinding surface 22 that is a part of a sphere with a radius of curvature of, e.g., 0.5 inches.

Figure 3A:
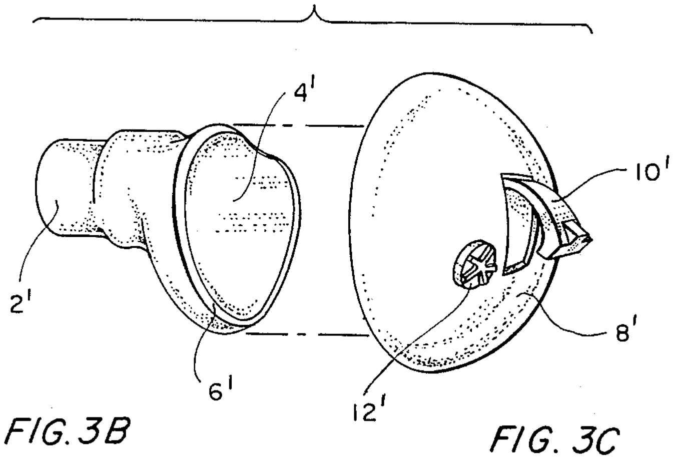
FIGS. 3A–3C are perspective drawings illustrating manufacture of a hearing aid in accordance with the invention.
Figure 3B:
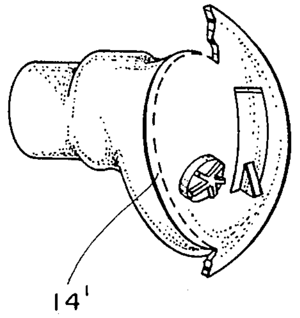
Figure 3C:
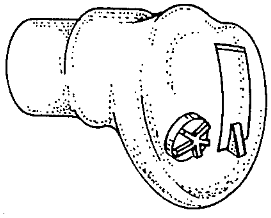
Figure 4A:
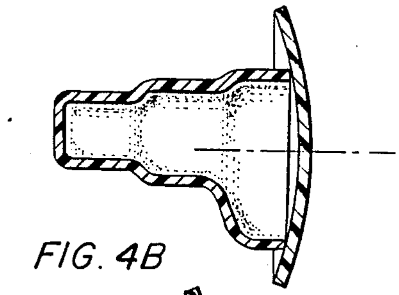
FIGS. 4A–4C are schematic cross-sectional views of a hearing aid in accordance with the invention.
Figure 4B:
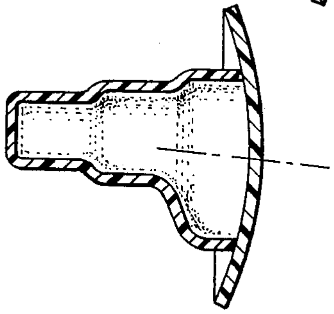
Figure 4C:
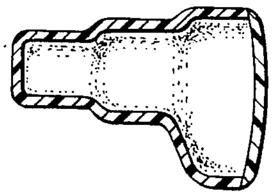

The mating surface 6' of the shell 2' is thus appropriately shaped to mate with a faceplate 8 that is shaped to form a part of a sphere with an internal radius of curvature of 0.5 inches. As is shown in FIGS. 3A–3C, the faceplate 8' is cut down to conform with the outer periphery of the shell 2' and the circumferential edge 14' is then rounded off. (See FIG. 3C).

The invention appears to be smaller because of the non-planar faceplate. Additionally, there is more room inside the invention into which electronic circuitry etc. can be fitted.

The battery door 10' and volume control 12' shown in the FIGURES are merely for purposes of illustration. They may be oriented and located otherwise than is shown. For example, there may be no volume control 12', the battery door 10' may be at an angle to the direction shown, etc. The shapes of the mating surface 6' and the faceplate 8' make it possible to move the faceplate 8' to the proper orientation before fixing the faceplate 8' to the open end 4' of the shell 2' and grinding the faceplate 8' down.

While grinding is presently preferred as a method of shaping the shell 2' and cutting down of the faceplate 8', this is only for convenience and other methods such as molding or shaping with heat may be used instead.

Those skilled in the art will understand that changes can be made in the preferred embodiments here described, and that these embodiments can be used for other purposes. Such changes and uses are within the scope of the invention, which is limited only by the claims which follow.

What is claimed is:

1. A method of manufacturing an ITE hearing aid, comprising the following steps:

manufacturing a shell with a non-planar circumferentially extending mating surface;

manufacturing a non-planar faceplate having an inner curved surface; and securing the inner curved surface of the faceplate to the shell at the circumferentially extending mating surface thereof.

2. The method of claim 1, wherein the step of producing the shell comprises the step of grinding the mating surface of the shell.

3. The process of claim 1, further comprising the step of cutting down the faceplate to conform to the outer periphery of the shell.

4. An ITE hearing aid, comprising:

a shell with an open end delimited by a non-planar circumferentially extending mating surface; and a non-planar faceplate having an inner curved surface, the inner curved surface being attached to the shell at the circumferentially extending mating surface thereof.

5. The hearing aid of claim 4 wherein said faceplate is shaped as a part of a sphere and said surface of said shell mates with said faceplate.

* * * * *